(No Model.)

G. WHITE.
GEAR.

No. 290,299. Patented Dec. 18, 1883.

Witnesses
H. C. Remick
L. J. White

Inventor,
George White,
Per C. A. Shaw
Atty.

UNITED STATES PATENT OFFICE.

GEORGE WHITE, OF BOSTON, MASSACHUSETTS.

GEAR.

SPECIFICATION forming part of Letters Patent No. 290,299, dated December 18, 1883.

Application filed July 17, 1883. (No model.)

*To all whom it may concern:*

Be it known that I, GEORGE WHITE, of Boston, in the county of Suffolk, State of Massachusetts, have invented a certain new and useful Improvement in Gears, of which the following is a description sufficiently full, clear, and exact to enable any person skilled in the art or science to which said invention appertains to make and use the same, reference being had to the accompanying drawings, forming a part of this specification, in which—

Figure 1:
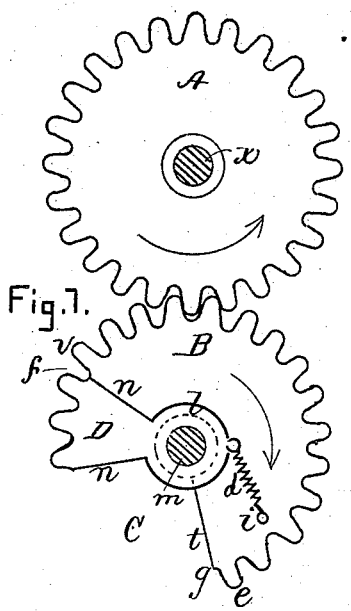
Figure 2:
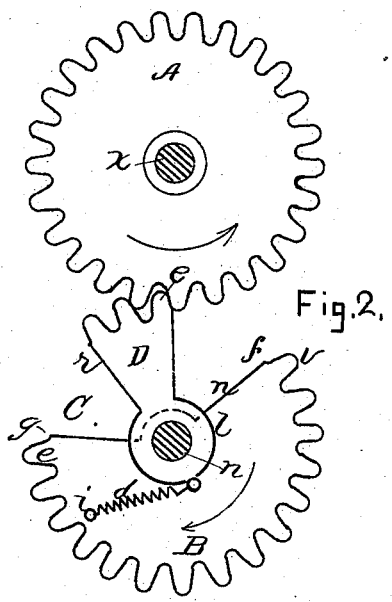
Figure 3:
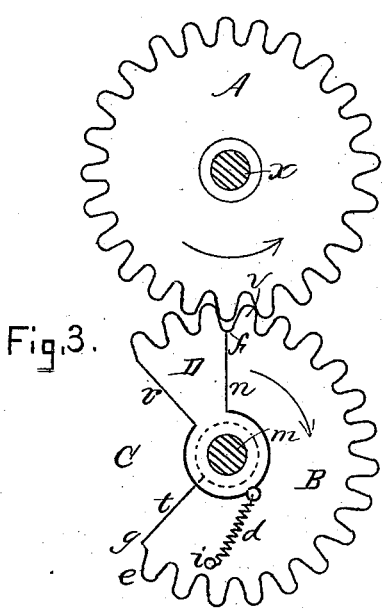

Figures 1, 2, 3, and 4 are side elevations, Fig. 1 showing the segment closed and out of contact with the main gear; Fig. 2, the segment partially opened and in contact with the main gear; Fig. 3, the segment closed but just entering into contact with the main gear, and Fig. 4 the segment closed and immediately after having left the main gear.

My invention relates to that class of gears known as "mutilated" gears, or gears having a portion of their toothed peripheries removed to form blanks; and it consists in a novel construction and arrangement of the parts, as hereinafter more fully set forth and claimed, by which such gears are rendered more effective than those of ordinary construction.

In the drawings, A represents the main gear, and B the mutilated gear, which are arranged to intermesh, and respectively journaled on the shafts $x\,m$. A section of the gear B, from $f$ to $g$, is removed from the periphery to near its center, as shown at C, and arranged to work in the space thus formed there is a toothed segment, D, which may be provided with three or more teeth, in accordance with the size of the gear with which it is used. The segment D is concentrically journaled with the gear B, and has an extension or plate, $l$, on the outer face of said gear, which is provided with a coiled spring, $d$, the outer end of which is secured to the gear at $i$ near the point $g$, said spring acting contractively to close the segment or keep it in contact with the gear at $n$.

Figure 4:
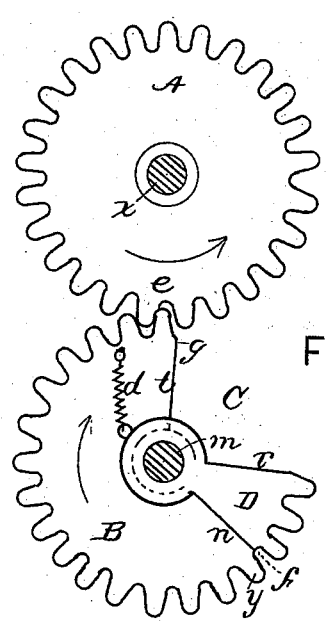

In the use of my improvement, the gear B, being rotated by the shaft $m$ in the direction shown by the arrow thereon, will cause the gear A to turn in an opposite direction, and when the segment D, advancing with the gear B, is brought into contact with the gear A, as shown in Fig. 3, and the last tooth, $v$, on the body of the gear B escapes, the wheel A will stop revolving, and the segment D, advancing with the gear B, will also stop until the side $r$ of said segment is brought into contact with the side $t$ of the opening in the revolving gear B, when the segment will again be carried forward, causing the wheel A to revolve and the first tooth, $e$, and the succeeding teeth on the body of the gear B to properly intermesh with the teeth on the gear A, as shown in Fig. 4. As it requires more power to overcome the inertia of the gear A or the friction of said gear on its journal $x$ when it is at rest than it does to overcome the contractile action of the spring $d$, it will be obvious that when the gear B is revolved to bring the segment D into contact with the gear A the segment will be stopped in its advance until brought into contact with the side $t$ of the rotating gear B, and that the teeth of the segment, being correspondingly spaced with the teeth on the body of the gear B, will guide the teeth on the gear A, and cause the gears to properly intermesh in a manner which will be readily obvious to all conversant with such matters without a more explicit description.

I do not confine myself to the use of the spring for moving the segment to bring it properly into position, as other means may be employed with substantially the same result, if desired, although I deem a spring preferable.

When an ordinary gear of this character is used to drive another gear, a difficulty sometimes arises, the momentum of the driven gear causing it to advance for a short distance after the last tooth, $v$, on the mutilated gear has escaped therefrom, thereby bringing the driven gear into a wrong position and preventing the first tooth, $e$, and the succeeding teeth on the gear B from properly intermeshing with the teeth on the gear A as the gear B revolves, and thus causing the teeth to be broken or the gears interlocked and stopped—a defect which is entirely overcome by my improvement.

Having thus explained my invention, what I claim is—

1. The gear B, provided with the pivoted segment D and spring d, constructed, combined, and arranged to operate substantially as set forth.

2. The gear B, having the pivoted segment D, provided with the spring d, or with means for moving said segment to bring it into position, in combination with the gear A, substantially as shown and described.

GEORGE WHITE.

Witnesses:
C. A. SHAW,
L. J. WHITE.